United States Patent
He et al.

(10) Patent No.: US 9,971,318 B2
(45) Date of Patent: May 15, 2018

(54) METHOD AND APPARATUS FOR ROBUST TUNING OF MODEL-BASED PROCESS CONTROLLERS USED WITH UNCERTAIN MULTIPLE-INPUT, MULTIPLE-OUTPUT (MIMO) PROCESSES

(71) Applicant: Honeywell ASCa Inc., Mississauga (CA)

(72) Inventors: Ning He, Edmonton (CA); Dawei Shi, Beijing (CN); Michael Forbes, North Vancouver (CA); Johan U. Backstrom, North Vancouver (CA); Tongwen Chen, Edmonton (CA)

(73) Assignee: Honeywell Limited, Mississauga (CA)

( * ) Notice: Subject to any disclaimer, the term of this patent is extended or adjusted under 35 U.S.C. 154(b) by 373 days.

(21) Appl. No.: 14/729,930

(22) Filed: Jun. 3, 2015

(65) Prior Publication Data

US 2016/0357162 A1 Dec. 8, 2016

(51) Int. Cl.
*G05B 13/04* (2006.01)
*G02B 15/02* (2006.01)
(Continued)

(52) U.S. Cl.
CPC ......... *G05B 13/047* (2013.01); *G05B 13/042* (2013.01); *G05B 15/02* (2013.01); *G06F 17/10* (2013.01)

(58) Field of Classification Search
CPC .... G05B 13/042; G05B 13/047; G05B 15/02; G06F 17/10
See application file for complete search history.

(56) References Cited

U.S. PATENT DOCUMENTS 5,351,184 A 9/1994 Lu et al.
5,561,599 A 10/1996 Lu
(Continued)

FOREIGN PATENT DOCUMENTS

WO WO 2008/139006 A1 11/2008
WO 2010138452 A1 12/2010

OTHER PUBLICATIONS

International Search Report dated Jun. 9, 2015 in connection with International Application No. PCT/CA2015/000146; 3 pages.
(Continued)

*Primary Examiner* — Yuhui R Pan (57) ABSTRACT

A method includes obtaining information identifying (i) uncertainties associated with multiple time-domain parameters of a model and (ii) time-domain performance specifications for a model-based industrial process controller. The model mathematically represents a MIMO industrial process. The method also includes generating multiple tuning parameters for the controller based on the uncertainties and the time-domain performance specifications. The tuning parameters include vectors of tuning parameters associated with the controller, and each vector includes values associated with different outputs of the industrial process. The time-domain parameters could include a process gain, a time constant, and a time delay for each input-output pair of the model. The time-domain performance specifications could include requirements related to worst-case overshoots, settling times, and total variations. The uncertainties could be specified as intervals in which the time-domain parameters lie.

15 Claims, 5 Drawing Sheets

(51) Int. Cl.
G06F 17/10 (2006.01)
G05B 15/02 (2006.01)

(56) References Cited

U.S. PATENT DOCUMENTS

| | | | |
|---|---|---|---|
| 5,572,420 A | 11/1996 | Lu | |
| 5,574,638 A | 11/1996 | Lu | |
| 5,758,047 A | 5/1998 | Lu et al. | |
| 6,055,483 A | 4/2000 | Lu | |
| 6,122,555 A | 9/2000 | Lu | |
| 6,253,113 B1* | 6/2001 | Lu | G05B 5/01 700/28 |
| 6,697,767 B2 | 2/2004 | Wang et al. | |
| 2002/0111758 A1 | 8/2002 | Wang et al. | |
| 2007/0078529 A1* | 4/2007 | Thiele | G05B 13/048 700/29 |
| 2011/0130850 A1* | 6/2011 | Zheng | G05B 13/048 700/31 |
| 2014/0358254 A1 | 12/2014 | Chu et al. | |

OTHER PUBLICATIONS

Written Opinion of the International Searching Authority dated Jun. 9, 2015 in connection with International Application No. PCT/CA2015/000146; 4 pages.
J.M. Maciejowski; "Predictive Control with Constraints"; Pearson Education Limited; Published 2002; 6 pages.
S.Skogestad and I. Postlethwaite, "Multivariable Feedback Control: Analysis and Design", New York: John Wiley & Sons 1996, 8 pages.
K. Zhou and J.C. Doyle, "Essentials of robust control", Englewood Cliffs, New Jersey: Prentice-Hall 1998, 3 pages.
J. Hu, C. Bohn, and H.R. Wu, "Systematic h∞ weighting function selection and its application to the real-time control of a vertical take-off aircraft", Control Engineering Practice, vol. 8, pp. 241-252, 2000, 12 pages.
M.S. Bazaraa, H.D. Sherali, and C.M. Shetty, Nonlinear Programming: Theory and Algorithms, John Wiley & Sons, Inc. 1979, 3 pages.
J.M. Maciejowski, "Predictive Control with Constraints", New York: Prentice-Hall 2002, 4 pages.
Junqiang Fan et al., "Two-Dimensional Frequency Response Analysis and Insights for Weight Selection in Cross-Directional Model Predictive Control", Proceedings from 42nd IEEE, Maui, Hawaii, USA, Dec. 2003, pp. 3717-3723.
Jorge L. Garriga et al. "Model Predictive Controller Tuning via Eigenvalue Placement", 2008 American Control Conference, Seattle, WA, Jun. 11-13, 2008, pp. 429-434.
C. Mohtadi et al. "Frequency response characteristics of MIMO GPC", Int. J. Control, 1992, vol. 55, No. 4, Taylor & Francis Ltd., p. 877-900.
Camile Rowe et al, "Tuning MPC using H∞ Loop Shaping", American Control Conference-IEEE1216, Chicago, IL, Jun. 2000, pp. 1332-1336.
Gaurang Shah et al. "Tuning MPC for Desired Closed-Loop Performance for MIMO Systems", American Control Conference, San Francisco, CA, Jun. 29-Jul. 1, 2011, pp. 4404-4409.
Stefano D. Cairano et al. "Model Predictive Control Tuning by Controller Matching", IEEE Transactions on Automatic Control, vol. 55, No. 1, Jan. 2010, pp. 185-190.
He Kong et al. "Predictive metamorphic control", www.elsevier.com/locate/automatica, Automatica 49 (2013), pp. 3670-3676.
Jorge L. Garriga et al. "Model Predictive Control Tuning Methods: A Review", American Chemical Society Published on Web Mar. 19, 2010, 49, pp. 3505-3515.
David Angeli et al. "An ellipsoidal off-line MPC scheme for uncertain polytopic discrete-time systems", www.elsevier.com/locate/automatica, Automatica 44—(2008), pp. 3113-3119.
Nikos Vlassis et al. "Polytopic uncertainty for linear systems: New and old complexity results", Luxembourg Centre for Systems Biomedicine, Feb. 12, 2014—13 Pages.
Ning He et al. "User Friendly Robust MPC Tuning of Uncertain Paper-Making Processes", Department of Electrical and Computer Engineering, University of Alberta, Edmonton, Alberta, Canada, Feb. 2015, 6 Pages.
U.S. Appl. No. 14/314,221; "Method and Apparatus for Specifying and Visualizing Robust Tuning of Model-Based Controllers"; filed Jun. 25, 2014—48 Pages.
Notification of Transmittal of the International Search Report and the Written Opinion of the International Searching Authority issued for PCT/CA2016/000153 dated Jun. 22, 2016, 9 pages.
Silvina I. Biagiola, et al., "Identification of Uncertain MIMO Wiener and Hammerstein Models", Computers and Chemical Engineering, Jun. 16, 2011, vol. 35(12), pp. 2867-2875.
Thai-Hoang Huynh, "A Modified Shuffled Frog Leaping Algorithm for Optimal Tuning of Multivariable PID Controllers", IEEE International Conference on Industrial Technology, ICT 2008, Apr. 21-24, 2008, pp. 1-6.

* cited by examiner

METHOD AND APPARATUS FOR ROBUST TUNING OF MODEL-BASED PROCESS CONTROLLERS USED WITH UNCERTAIN MULTIPLE-INPUT, MULTIPLE-OUTPUT (MIMO) PROCESSES

CROSS-REFERENCE TO RELATED APPLICATION

This application is related to U.S. patent application Ser. No. 14/314,221 filed on Jun. 25, 2014 and entitled "METHOD AND APPARATUS FOR SPECIFYING AND VISUALIZING ROBUST TUNING OF MODEL-BASED CONTROLLERS," which is hereby incorporated by reference in its entirety.

TECHNICAL FIELD

This disclosure relates generally to industrial process control systems. More specifically, this disclosure relates to a method and apparatus for robust tuning of model-based process controllers used with uncertain multiple-input, multiple-output (MIMO) processes.

BACKGROUND

Model predictive control (MPC) techniques use one or more models to predict the future behavior of an industrial process. Control signals for adjusting the industrial process are then generated based on the predicted behavior. MPC techniques have become widely accepted in various industries, such as the oil and gas, pulp and paper, food processing, and chemical industries.

When tuning an MPC or other model-based process controller for industrial use, it is often necessary or desirable to find tuning parameters that ensure good controller performance in spite of both (i) process disturbances and (ii) mismatches between a model used by the controller and the actual process. This problem falls into the discipline of "control theory" and the practice known as "robust control." Standard robust control techniques use a concept known as "unstructured uncertainty," which generally involves analyzing and specifying performance in the frequency domain. These robust control techniques have been used to successfully tune process controllers in a variety of industries.

SUMMARY

This disclosure provides a method and apparatus for robust tuning of model-based process controllers used with uncertain multiple-input, multiple-output (MIMO) processes.

In a first embodiment, a method includes obtaining information identifying (i) uncertainties associated with multiple time-domain parameters of a model and (ii) time-domain performance specifications for a model-based industrial process controller. The model mathematically represents a MIMO industrial process. The method also includes generating multiple tuning parameters for the controller based on the uncertainties and the time-domain performance specifications. The tuning parameters include vectors of tuning parameters associated with the controller, and each vector includes values associated with different outputs of the industrial process.

In a second embodiment, an apparatus includes at least one memory configured to store information identifying (i) uncertainties associated with multiple time-domain parameters of a model and (ii) time-domain performance specifications for a model-based industrial process controller. The model mathematically represents a MIMO industrial process. The apparatus also includes at least one processing device configured to generate multiple tuning parameters for the controller based on the uncertainties and the time-domain performance specifications. The tuning parameters include vectors of tuning parameters associated with the controller, and each vector includes values associated with different outputs of the industrial process.

In a third embodiment, a non-transitory computer readable medium contains instructions that when executed cause at least one processing device to obtain information identifying (i) uncertainties associated with multiple time-domain parameters of a model and (ii) time-domain performance specifications for a model-based industrial process controller. The model mathematically represents a MIMO industrial process. The instructions when executed also cause at least one processing device to generate multiple tuning parameters for the controller based on the uncertainties and the time-domain performance specifications. The tuning parameters include vectors of tuning parameters associated with the controller, and each vector includes values associated with different outputs of the industrial process.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 3A through 5B illustrate details of an example technique for robust tuning of a model-based process controller used with an uncertain MIMO process according to this disclosure.

DETAILED DESCRIPTION

FIGS. 1 through 5B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, standard robust control techniques have been used to successfully tune model predictive control (MPC) and other model-based process controllers in a variety of industries. However, standard robust control techniques often rely upon highly-trained and highly-knowledgeable personnel. This often makes it more difficult and expensive to tune model-based process controllers.

This disclosure provides techniques that support robust tuning of MPC and other model-based controllers that are used with multiple-input, multiple-output (MIMO) multi-variable processes having model uncertainty. A specific example described below involves robust tuning of machine-direction (MD) MPC controllers for paper or other web manufacturing or processing systems. Among other things, these techniques can be used to achieve satisfactory closed-loop responses that are quantified by characteristics such as overshoots, total variations, and settling times under parametric uncertainty within a limited tuning time. An efficient visualization technique for an uncertain MIMO process is described to characterize the set of possible step responses for outputs of the MIMO process due to the parametric uncertainty. The tuning problem can be formulated as an optimization problem with an implicit objective function and constraints. Based on the visualization technique and properties of performance indices, an automatic tuning algorithm is described to solve the optimization problem. In addition, a technique to predict the computation time of the tuning algorithm is described, which could be used to improve user-friendliness of the overall algorithm.

Depending on the implementation, the techniques disclosed in this patent document allow for the robust tuning of model-based process controllers. Example features of the techniques can include:

(1) the specification of model uncertainty in terms of simple model parameters;

(2) the specification of controller performance using simple time-domain concepts (such as settling time, overshoot, and total variation) for each process output;

(3) the visualization of robust performance through step and disturbance response plots with envelopes of possible responses given the uncertainty of a model;

(4) an algorithm (such as a MATLAB algorithm) that takes user-friendly specifications and returns appropriate tuning parameters for a MIMO model-based process controller; and (5) an algorithm (such as a MATLAB algorithm) that provides robust performance envelope visualization for a multivariable process.

In some embodiments, a user interface can be provided that allows users to enter model uncertainty specifications and performance specifications. The user interface can also allow users to view resulting tuning parameters and visualize the resulting controller performance.

Note that in the following description, an example of this functionality is given with respect to use with a controller in a paper manufacturing system. However, this disclosure is not limited to use with controllers in paper manufacturing systems. The techniques disclosed in this patent document can be used with any suitable model-based controller that is used to control any aspect(s) of an uncertain MIMO process.

Figure 1:
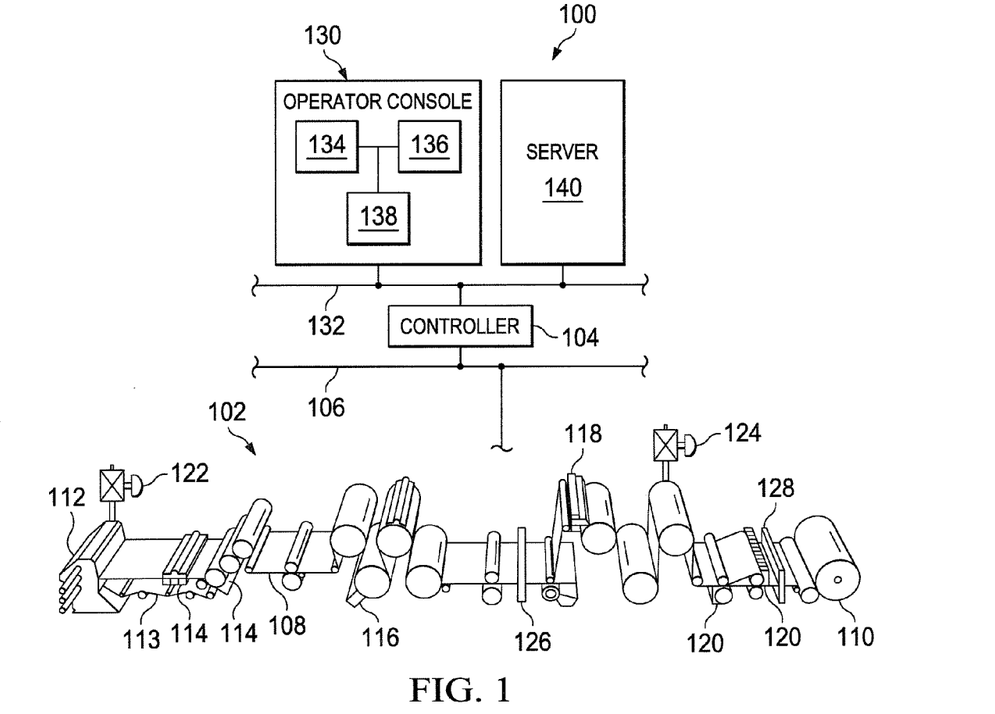
FIG. 1 illustrates an example web manufacturing or processing system according to this disclosure.

FIG. 1 illustrates an example web manufacturing or processing system 100 according to this disclosure. As shown in FIG. 1, the system 100 includes a paper machine 102, a controller 104, and a network 106. The paper machine 102 includes various components used to produce a paper product, namely a paper web 108 that is collected at a reel 110. The controller 104 monitors and controls the operation of the paper machine 102, which may help to maintain or increase the quality of the paper web 108 produced by the paper machine 102. In the following description, the machine direction (MD) of the web 108 denotes the direction along the (longer) length of the web 108.

In this example, the paper machine 102 includes at least one headbox 112, which distributes a pulp suspension uniformly across the machine onto a continuous moving wire screen or mesh 113. The pulp suspension entering the headbox 112 may contain, for example, 0.2-3% wood fibers, fillers, and/or other materials, with the remainder of the suspension being water. Arrays of drainage elements 114, such as vacuum boxes, remove as much water as possible to initiate the formation of the web 108. An array of steam actuators 116 produces hot steam that penetrates the paper web 108 and releases the latent heat of the steam into the paper web 108. An array of rewet shower actuators 118 adds small droplets of water (which may be air atomized) onto the surface of the paper web 108. The paper web 108 is then often passed through a calender having several nips of counter-rotating rolls. Arrays of induction heating actuators 120 heat the shell surfaces of various ones of these rolls.

Two additional actuators 122-124 are shown in FIG. 1. A thick stock flow actuator 122 controls the consistency of incoming stock received at the headbox 112. A steam flow actuator 124 controls the amount of heat transferred to the paper web 108 from drying cylinders. The actuators 122-124 could, for example, represent valves controlling the flow of stock and steam, respectively. These actuators may be used for controlling the dry weight and moisture of the paper web 108. Additional flow actuators may be used to control the proportions of different types of pulp and filler material in the thick stock and to control the amounts of various additives (such as retention aid or dyes) that are mixed into the stock.

This represents a brief description of one type of paper machine 102 that may be used to produce a paper product. Additional details regarding this type of paper machine 102 are well-known in the art and are not needed for an understanding of this disclosure.

In order to control the paper-making process, one or more properties of the paper web 108 may be continuously or repeatedly measured. The web properties can be measured at one or various stages in the manufacturing process. This information may then be used to adjust the paper machine 102, such as by adjusting various actuators within the paper machine 102. This may help to compensate for any variations of the web properties from desired targets, which may help to ensure the quality of the web 108.

As shown in FIG. 1, the paper machine 102 includes one or more scanners 126-128, each of which may include one or more sensors. Each scanner 126-128 is capable of measuring one or more characteristics of the paper web 108. For example, each scanner 126-128 could include sensors for measuring the tension, caliper, moisture, anisotropy, basis weight, color, gloss, sheen, haze, surface features (such as roughness, topography, or orientation distributions of surface features), or any other or additional characteristics of the paper web 108.

Each scanner 126-128 includes any suitable structure or structures for measuring or detecting one or more characteristics of the paper web 108, such as one or more sets of sensors. The use of scanners represents one particular embodiment for measuring web properties. Other embodiments could be used, such as those including one or more stationary sets or arrays of sensors, deployed in one or a few locations across the web or deployed in a plurality of locations across the whole width of the web such that substantially the entire web width is measured.

The controller 104 receives measurement data from the scanners 126-128 and uses the data to control the paper machine 102. For example, the controller 104 may use the measurement data to adjust any of the actuators or other components of the paper machine 102. The controller 104 includes any suitable structure for controlling the operation of at least part of the paper machine 102, such as a computing device. Note that while a single controller 104 is shown here, multiple controllers 104 could be used, such as different controllers that control different variables of the web.

The network 106 is coupled to the controller 104 and various components of the paper machine 102 (such as the actuators and scanners). The network 106 facilitates communication between components of the system 100. The network 106 represents any suitable network or combination of networks facilitating communication between components in the system 100. The network 106 could, for example, represent a wired or wireless Ethernet network, an electrical signal network (such as a HART or FOUNDATION FIELDBUS network), a pneumatic control signal network, or any other or additional network(s).

The controller(s) 104 can operate to control one or more aspects of the paper machine 102 using one or more models. For example, each model could associate one or more manipulated variables with one or more controlled variables. A controlled variable generally represents a variable that can be measured or inferred and that is ideally controlled to be at or near a desired setpoint or within a desired range of values. A manipulated variable generally represents a variable that can be adjusted in order to alter one or more controlled variables.

In order to tune a controller 104, at least one operator console 130 can communicate with the controller 104 over a network 132. The operator console 130 generally represents a computing device that supports one or more techniques for robust tuning of MPC and other model-based controllers that are used to control MIMO processes having model uncertainty. The techniques for robust tuning of model-based controllers are described in more detail below. The techniques for robust tuning generally involve identifying tuning parameters for a controller and outputting the tuning parameters to the controller for use during subsequent control operations. The network 132 represents any suitable network or combination of networks that can transport information, such as an Ethernet network.

In this example, the operator console 130 includes one or more processing devices 134, one or more memories 136, and one or more interfaces 138. Each processing device 134 includes any suitable processing or computing device, such as a microprocessor, microcontroller, digital signal processor, field programmable gate array, application specific integrated circuit, or discrete logic devices. Each memory 136 includes any suitable storage and retrieval device, such as a random access memory (RAM) or Flash or other read-only memory (ROM). Each interface 138 includes any suitable structure facilitating communication over a connection or network, such as a wired interface (like an Ethernet interface) or a wireless interface (like a radio frequency transceiver).

Note that while the operator console 130 is described as implementing the technique(s) for robust tuning of model-based controllers, other types of devices could also be used. For instance, the operator console 130 could interact with a server 140, and the server 140 could actually execute the algorithms used to implement one or more techniques for robust tuning of model-based controllers. In this case, the operator console 130 could present a graphical user interface and interact with a user. The server 140 could include one or more processing devices, one or more memories, and one or more interfaces (similar to the operator console 130).

Although FIG. 1 illustrates one example of a web manufacturing or processing system 100, various changes may be made to FIG. 1. For example, other systems could be used to produce other paper or non-paper products. Also, while shown as including a single paper machine 102 with various components and a single controller 104, the system 100 could include any number of paper machines or other machinery having any suitable structure, and the system 100 could include any number of controllers. In addition, FIG. 1 illustrates one example operational environment in which MPC or other model-based controller(s) can be tuned. This functionality could be used in any other suitable system, regardless of whether the system is used to manufacture or process webs of material.

In the following description, robust tuning techniques are described with respect to a tuning problem for an MD-MPC controller in a MIMO process under parametric uncertainty, where the techniques consider time-domain performance indices. "MD-MPC" here indicates that an MPC controller being tuned is used to control an MD property of a web 108.

The parameter tuning problem for an MPC or other model-based controller is often challenging, and it becomes even more challenging when MIMO processes are considered. One conventional approach for parameter tuning of an MPC controller is to fix all MPC tuning parameters except one in order to identify a tuning problem with one degree of freedom (1DOF). By adjusting this parameter, an analysis of the relationship between the closed-loop performance of the controller and the corresponding degree of freedom can occur, and some tuning guidelines can be developed based on this type of analysis. In another conventional approach, MPC parameters for a MIMO system can be tuned by solving two semi-definite programming problems sequentially in order to achieve a desired closed-loop performance. In yet another conventional approach, controller parameters are tuned by matching an unconstrained MIMO MPC with a preassigned multivariable controller so that the properties of the preassigned controller could be inherited. Still other conventional approaches have involved a tuning-friendly MPC framework in which a tuning parameter is used to adjust a controller's performance. However, despite these approaches, a user-friendly tuning approach for uncertain MIMO processes is still missing.

U.S. patent application Ser. No. 13/907,495 (hereby incorporated by reference in its entirety) discloses a two degree of freedom (2DOF) MPC tuning framework. U.S. patent application Ser. No. 14/314,221 (incorporated by reference above) uses this framework to, among other things, provide for robust tuning of a single-input, single-output (SISO) system. This disclosure uses the 2DOF MPC tuning framework to help simplify the tuning of MPC or other model-based controllers for MIMO systems with some model uncertainty associated with the MIMO systems.

System Description and Problem Formulation

Figure 2:
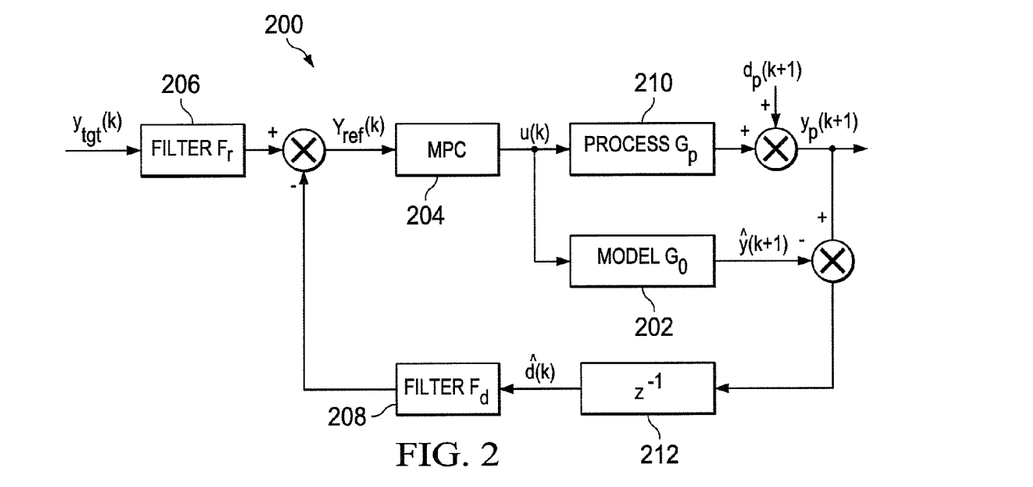
FIG. 2 illustrates an example internal model control structure employed for model predictive control (MPC) of an uncertain multiple-input, multiple-output (MIMO) process according to this disclosure.

FIG. 2 illustrates an example internal model control structure 200 employed for MPC of an uncertain MIMO process according to this disclosure. This closed-loop system includes three main parts: a process model ($G_O$) 202, an MPC controller 204, and user-specified filters ($F_r$ and $F_d$) 206-208. The process model 202 is used to mathematically represent a multivariable MIMO process ($G_0$) 210. There is also typically some time delay 212 associated with feedback in the closed-loop system, which is shown here as a first-order delay but could include delay(s) of other or additional order(s).

In FIG. 2, $G_p \in \mathbb{R}^{m \times n}$ and $G_0 \in \mathbb{R}^{m \times n}$ are transfer function matrices of the real industrial process and the nominal process model, respectively. In some embodiments, all sub-systems in $G_p$ and $G_0$ have a first-order-plus-dead-time (FOPDT) structure. Therefore, the real process $G_p$ 210 can be represented as:

$$G_p(s) = \begin{bmatrix} G_p^{11}(s) & \cdots & G_p^{1n}(s) \\ \vdots & \ddots & \vdots \\ G_p^{m1}(s) & \cdots & G_p^{mn}(s) \end{bmatrix}, \quad (1)$$

$$G_p^{ij}(s) = \frac{k_{ij}}{\tau_{ij}s+1}e^{-T_{ij}s}, \quad 1 \le i \le m, \ 1 \le j \le n,$$

where $k_{ij}$, $\tau_{ij}$, and $T_{ij}$ are the real process gain, time constant, and time delay for $G_p^{ij}$, respectively, and ij denotes the pair of $i^{th}$ input and $j^{th}$ output of the MIMO process. As model mismatches, disturbances, and noise exist in practice, $G_p(s)$ is typically not known with exact certainty. Thus, a nominal model $G_0(s)$ can be identified as an approximation of $G_p(s)$. For example, the nominal model $G_0(s)$ could be expressed as:

$$G_0(s) = \begin{bmatrix} G_0^{11}(s) & \cdots & G_0^{1n}(s) \\ \vdots & \ddots & \vdots \\ G_0^{m1}(s) & \cdots & G_0^{mn}(s) \end{bmatrix}, \quad (2)$$

$$G_0^{ij} = \frac{k_{ij}^0}{\tau_{ij}^0 s+1}e^{-T_{ij}^0 s}, \quad 1 \le i \le m, \ 1 \le j \le n,$$

where $k_{ij}^0$, $\tau_{ij}^0$, and $T_{ij}^0$ can be obtained from a process identification software tool based on input/output data of the real process or in any other suitable manner.

Because differences between the actual process 210 and the identified nominal model 202 are typically inevitable, this model mismatch can be taken into consideration when performing controller tuning. Two types of uncertainties are routinely used in robust control, namely parametric uncertainty and unstructured uncertainty. Unstructured uncertainty is often difficult to understand and specify by end users. Therefore, in some embodiments, only parametric uncertainty may be considered for parameter tuning during robust tuning of MPC and other model-based controllers used with MIMO processes having model uncertainty. Note, however, that other approaches could explicitly consider unstructured uncertainty.

Parametric uncertainty can be modeled in the following form:

$$k_{ij} \in [\underline{k}_{ij}, \overline{k}_{ij}], \tau_{ij} \in [\underline{\tau}_{ij}, \overline{\tau}_{ij}], T_{ij} \in [\underline{T}_{ij}, \overline{T}_{ij}], 1 \le i \le m, 1 \le j \le n, \quad (3)$$

where $\underline{k}_{ij}$ and $\overline{k}_{ij}$, $\underline{\tau}_{ij}$ and $\overline{\tau}_{ij}$, and $\underline{T}_{ij}$ and $\overline{T}_{ij}$ are the lower and upper bounds defining ranges or intervals of mismatch for the three model parameters $k_{ij}$, $\tau_{ij}$, and $T_{ij}$. Based on this, a set of possible perturbed process models can be denoted as:

$$\Pi := \{G_p(s): k_{ij} \in [\underline{k}_{ij}, \overline{k}_{ij}], \tau_{ij} \in [\underline{\tau}_{ij}, \overline{\tau}_{ij}], T_{ij} \in [\underline{T}_{ij}, \overline{T}_{ij}], 1 \le i \le m, 1 \le j \le n\}. \quad (4)$$

With respect to the MPC controller 204, let $H_u$ denote the control horizon, and let $H_p$ denote the prediction horizon (where $1 \le H_u \le H_p$). In some embodiments, the MPC controller 204 in FIG. 2 operates to solve the following finite-horizon optimal control problem:

$$\min_{\Delta U} J = (\hat{Y}(k) - Y_{ref}(k))^T Q_1 (\hat{Y}(k) - Y_{ref}(k)) + \Delta U(k)^T Q_2 \Delta U(k) + \quad (5)$$
$$(U_{H_u}(k) - U_{ref}(k))^T Q_3 (U_{H_u}(k) - U_{ref}(k))$$

s.t. $\hat{x}(k+i) = A^i \hat{x}(k) + \sum_{j=1}^{\min\{H_u, i\}} A^{i-j} B \Delta u(k+j-1),$ $\hat{y}(k+i) = C\hat{x}(k+i)$, for $i = 1, 2, \ldots, H_p$, where:

$$\hat{Y}(k) = \begin{bmatrix} \hat{y}(k+1) \\ \hat{y}(k+2) \\ \vdots \\ \hat{y}(k+H_p) \end{bmatrix}, \Delta U(k) = \begin{bmatrix} \Delta u(k) \\ \Delta u(k+1) \\ \vdots \\ \Delta u(k+H_u-1) \end{bmatrix}, \quad (6)$$

$$U_{H_u}(k) = \begin{bmatrix} 1 \\ 1 \\ \vdots \\ 1 \end{bmatrix} u(k-1) + \begin{bmatrix} 1 & 0 & \cdots & 0 \\ 1 & 1 & \ddots & \vdots \\ \vdots & \ddots & \ddots & 0 \\ 1 & \cdots & 1 & 1 \end{bmatrix} \Delta U(k). \quad (7)$$

Here, $U_{ref}$ and $Y_{ref}$ are reference signal vectors of $U_{H_u}$ and $\hat{Y}$, respectively, and $Q_1$, $Q_2$, and $Q_3$ are weighting matrices.

Given the MPC controller 204 and process model 202 described above, the two user-specified filters $F_r$ and $F_d$ 206-208 in FIG. 2 are used respectively for filtering an output target $y_{tgt}(k)$ and an estimated disturbance ($\hat{d} \triangleq y(k) - \hat{y}(k)$), which constitute the MIMO 2DOF MPC structure. Based on the filtered signals, the reference trajectory $Y_{ref}(k)$ can be calculated as follows:

$$Y_{ref}(k) = \begin{bmatrix} y_{ref}(k+1) \\ y_{ref}(k+2) \\ \vdots \\ y_{ref}(k+H_p) \end{bmatrix} = F_r(y_{tgt}(k)) - F_d(\hat{d}(k)), \quad (8)$$

where $F_r(\bullet)$ and $F_d(\bullet)$ are projection filters generated according to $f_r(z)$ and $f_d(z)$, and where $y_{ref}(z) = f_r(z)y_{tgt}(z) - f_d(z)\hat{d}(z)$. Here, $f_r(z)$ and $f_d(z)$ denote a reference tracking filter and a disturbance rejecting filter, which in some embodiments can be defined as follows:

$$f_r(z) = \begin{bmatrix} f_{r,1}(z) & 0 & 0 \\ 0 & \ddots & 0 \\ 0 & 0 & f_{r,m}(z) \end{bmatrix}, \text{ and} \quad (9)$$

$$f_{r,i}(z) := \frac{b_{r,i}z^{-1}}{1-a_{r,i}z^{-1}}z^{-T_i}, \quad 1 \le i \le m,$$

where $$a_{r,i} = e^{-\frac{T_s}{\tau_i \lambda_i}},$$

$b_{r,i} = 1 - a_{r,i}$; $f_{r,i}(z)$ is the reference tracking filter for the $i^{th}$ output. Define $\lambda = [\lambda_1, \lambda_2, \ldots, \lambda_m]$ as the reference tracking performance ratio vector, and define $f_d(z)$ as having the following form:

$$f_d(z) = \begin{bmatrix} f_{d,1}(z) & 0 & 0 \\ 0 & \ddots & 0 \\ 0 & 0 & f_{d,m}(z) \end{bmatrix}, \text{ and} \quad (10)$$

$$f_{d,i}(z) := \frac{b_{d,i}z^{-1}}{1-a_{d,i}z^{-1}} z^{-T_i}, 1 \le i \le m,$$

where $$a_{d,i} = e^{-\frac{T_s}{\tau_i \lambda_{d,i}}},$$

$b_{d,i}=1-a_{d,i}$, and $f_{d,i}(z)$ is the disturbance rejection filter for the $i^{th}$ output. Similarly, define $\lambda_d = [\lambda_{d,1}, \lambda_{d,2}, \ldots, \lambda_{d,m}]$ as the disturbance rejection performance ratio vector. A reference tracking performance ratio defines a ratio between a desired closed-loop reference tracking response time of a controller and an open-loop response time of an industrial process. A disturbance rejection performance ratio defines a ratio between a desired closed-loop disturbance rejecting response time of a controller and the open-loop response time of the industrial process. In this way, the MPC controller's performance can be adjusted by tuning $\lambda$ and $\lambda_d$ with fixed penalty matrices (which in some embodiments could be defined as $Q_1=I$; $Q_2=0.01\times I$; and $Q_3=0$, although other values could be used). As a result, the MPC tuning problem can be simplified.

As can be seen here, one part of the 2DOF MPC tuning problem is the design of $f_{r,i}(z)$ and $f_{d,i}(z)$ in Equations (9) and (10). In some embodiments, the design of $f_{r,i}(z)$ is based on, given the $i^{th}$ output, the open-loop transfer function from the input that dominates the output that is selected to construct this filter. One reason for this is to make the speed of the closed-loop response dependent on the speed of the dominant or primary open-loop response of the system according to the requirements for a specific product being produced. As for $f_{d,i}(z)$, the same design procedure can be applied, except that $\lambda_{d,i}$ can be used instead of $\lambda_i$ such that the output target and the estimated disturbance can be filtered separately.

Based on this, $\lambda$ and $\lambda_d$ (which may be referred to as the $\lambda$-parameters) are vectors with appropriate dimensions and are utilized to tune the closed-loop performance of the control structure 200, instead of (or in addition to) tuning the weighting matrices in an MPC cost function. Performance indices are specified via values such as overshoot, total variation, and settling time for each output of the MIMO process. This maintains the user-friendliness of the proposed tuning approach. However, due to inevitable time delays in process operations and model mismatches in model identification, the expressions of the closed-loop responses typically cannot be obtained explicitly, and the tuning problem is therefore difficult to formulate. Moreover, the complexity of the tuning problem can increase based on the system's size, and the relationship between the $\lambda$-parameters and each output of the MIMO system can be unclear. In addition, to guarantee a satisfactory user experience, the computation time of the tuning procedure should not only be limited by a specified amount of time but also be predictable without running the algorithm.

In accordance with this disclosure, the operator console 130, server 140, or other component(s) support an efficient heuristic approach to find a solution to the tuning problem for an MPC or other model-based controller used with an uncertain MIMO process. This approach supports the following capabilities.

An efficient time-domain performance visualization technique for MIMO processes is proposed, based on which the characterizations of possible step responses of a set of systems described by parametric uncertainties are obtained.

The tuning problem is cast into a constrained optimization problem and then transformed into a number of individual multiple-input, single-output (MISO) tuning problems, based on which the tuning problem is simplified. Utilizing the visualization technique and the simplified tuning problem, a fast tuning algorithm is disclosed, and controller parameters can be tuned for satisfactory performance within acceptable computation times.

An efficient technique to predict the overall computation time of the proposed tuning algorithm is disclosed, based on which end users can predict the tuning time without running the algorithm.

For a MIMO system, the overshoot, total variation, and settling time of each output can be considered as tuning measurements. Since the parametric uncertainty defined in Equation (3) results in a set of perturbed systems, the worst-case time-domain performance indices can be employed. Definitions for the worst-case overshoot, settling time, and total variation are as follows. The worst-case overshoot OS of a set of step responses with the same final value is the maximum value in all responses minus the final value divided by the final value. The worst-case settling time $T_s$ of a set of step responses with the same final value is the minimum time required for all responses to reach and stay within a range of a pre-specified percentage of the final value. The worst-case total variation TV, assuming the system converges to a target value within n steps, is:

$$TV = \max_{G_p \in \prod} \sum_{k=1}^{n} |y(k) - y(k-1)|. \quad (11)$$

These definitions are provided to characterize the worst-case performance for a set of step responses for SISO systems and thus are applicable for each of the outputs of a MIMO system. In some embodiments, end users can specify their requirements on each output directly via the worst-case time-domain performance indices, which improves the user-friendliness of the tuning algorithm.

Moreover, the tuning time (denoted $t_\lambda$) can be an important factor in a successful industrial process controller tuner design. For example, according to some guidelines of commercial paper machine tuner designs, the total time consumption of a tuning algorithm should not be more than half a minute, and in some embodiments this requirement can be considered as a hard constraint for the tuning algorithm disclosed in this patent document. Note that tuning time is normally not considered in existing MIMO tuning algorithms because (i) the limited computation time might affect the feasibility of these algorithms and (ii) the computation time is normally not predictable. A hard constraint on the tuning time can further increase the difficulty of solving the MIMO tuning problem.

Based on the factors mentioned above, some objectives of the tuning algorithm disclosed here include (i) determining $\lambda$ and $\lambda_d$ so that a closed-loop system (such as that shown in FIG. 2) is robustly stable and all outputs track their targets with fast responses, small overshoots, and small total variations, (ii) doing so within an acceptable tuning time, and (iii) doing so under the parametric uncertainties defined in Equation (3). In some embodiments, to accomplish these objectives, the tuning problem can be formulated as:

$$\min_{\lambda,\lambda_d} \|T_s(\lambda, \lambda_d)\|_\infty, \qquad (12)$$

$$\text{s.t. } OS_i(\lambda, \lambda_d) \leq OS_i^*, \; 1 \leq i \leq m,$$

$$TV_i(\lambda, \lambda_d) \leq TV_i^* \; 1 \leq i \leq m,$$

$$t_\lambda \leq 30 \text{ s},$$

where $\lambda=[\lambda_1, \lambda_2, \ldots, \lambda_m]$ and $\lambda_d=[\lambda_{d,1}, \lambda_{d,2}, \ldots, \lambda_{d,m}]$. Here, $OS(\lambda, \lambda_d):=[OS_1(\lambda, \lambda_d), OS_2(\lambda, \lambda_d), \ldots, OS_m(\lambda, \lambda_d)]$, $TV(\lambda, \lambda_d):=[TV_1(\lambda, \lambda_d), TV_2(\lambda, \lambda_d), \ldots, TV_m(\lambda, \lambda_d)]$, and $T_s(\lambda, \lambda_d):=[T_{s,1}(\lambda, \lambda_d), T_{s,2}(\lambda, \lambda_d), \ldots, T_{s,m}(\lambda, \lambda_d)]$ denote the worst-case overshoots, total variations, and settling times given $(\lambda, \lambda_d)$ for all outputs of the MIMO system $G_p(s)$ within the parametric uncertainty region, meaning $G_p(s)\in\Pi$. Also, $OS^*:=[OS_1^*, OS_2^*, \ldots, OS_m^*]$ and $TV^*:=[TV_1^*, TV_2^*, \ldots, TV_m^*]$ denote the specifications on the overshoots and total variations. Note that in Equation (12), $\lambda$ and $\lambda_d$ are tuned by minimizing the worst-case settling times of all outputs with the corresponding worst-case OS and TV lying within certain tolerable regions. As noted above, in some embodiments, the tuning time may be no more than half a minute ($t_\lambda \leq 30$ s).

Envelope Algorithm: MIMO Systems

This section describes a performance visualization technique to obtain the worst-case overshoots, settling times, and total variations for the outputs of a MIMO system. One goal here is to graphically characterize the envelopes of the responses of a set of MIMO systems satisfying $G_p(s)\in\Pi$ given the values of $\lambda$ and $\lambda_d$. As the system considered here has multiple outputs, an envelope is represented for each output. This allows end users to easily determine the effect of choosing a combination of $\lambda$ and $\lambda_d$.

In U.S. patent application Ser. No. 14/314,221 (incorporated by reference above), a visualization technique was described that characterizes the envelopes of the responses of a set of SISO FOPDT systems $G_p^*(s)$ under parametric uncertainty $G_p^*(s)\in\Pi_e:=\{G_p^*(s):k\in[\underline{k}, \overline{k}], \tau\in[\underline{\tau}, \overline{\tau}], T\in[\underline{T}, \overline{T}]\}$ via eight extreme case systems: $\Pi_E:=\{G_p^*(s):k\in\{\underline{k}, \overline{k}\}, \tau\in\{\underline{\tau}, \overline{\tau}\}, T\in\{\underline{T}, \overline{T}\}\}$, where k, $\tau$, and T are the gain, time constant, and time delay, respectively. Although all subsystems in the MIMO process $G_p(s)$ have a FOPDT structure and the parametric uncertainty of $G_p(s)$ is constructed by considering all subsystems in a way like $\Pi_e$, the approach mentioned above may not be used directly with a MIMO process due to the following factors. First, the number of extreme-case systems depends on the number of model parameters and becomes a large number even for a low-dimensional MIMO system (for instance, a 2-by-2 system includes four FOPDT subsystems and thus requires 84 extreme-case systems). Second, the computation time of the visualization method in the approach mentioned above increases rapidly as the number of extreme-case systems increases. Third, as the tuning procedure should be short (such as less than 30 seconds) and the performance visualization is only a small step in the overall tuning procedure, the computation time allowed for obtaining the envelopes may be very limited.

In some embodiments, to deal with this problem, the parameters of a MIMO system can be defined as follows:

$$k = \begin{bmatrix} k_{11} & \cdots & k_{1n} \\ \vdots & \ddots & \vdots \\ k_{m1} & \cdots & k_{mn} \end{bmatrix}, \tau = \begin{bmatrix} \tau_{11} & \cdots & \tau_{1n} \\ \vdots & \ddots & \vdots \\ \tau_{m1} & \cdots & \tau_{mn} \end{bmatrix} \qquad (13)$$

$$T = \begin{bmatrix} T_{11} & \cdots & T_{1n} \\ \vdots & \ddots & \vdots \\ T_{m1} & \cdots & T_{mn} \end{bmatrix}.$$

Based on this, the MIMO system with the parametric uncertainty as defined in Equation (3) can be approximated as:

$$\mathcal{P}_E := \{G_p(s): k\in\{\underline{k}, \overline{k}\}, \tau\in\{\underline{\tau}, \overline{\tau}\}, T\in\{\underline{T}, \overline{T}\}\}, \qquad (14)$$

where $\underline{k}, \underline{\tau}$ and $\underline{T}$ denote all entries in k, $\tau$, and T taking their minimum values in the uncertainty region and $\overline{k}, \overline{\tau}$, and $\overline{T}$ denote all entries in k, $\tau$, and T taking their maximum values in the uncertainty region. Note that $\mathcal{P}_E$ only includes eight extreme-case systems. Therefore, the envelopes of the MIMO system with the parametric uncertainty as defined in Equation (3) can be obtained via $\mathcal{P}_E$ with significantly reduced the computation time.

In some embodiments, based on $\mathcal{P}_E$, the envelopes of the step responses of a MIMO system with an MPC or other model-based controller can be obtained using the algorithm shown in Table I below. Although this approach may not be guaranteed to be optimal, it is intuitive in that the extreme behavior of the step responses mostly happens when all extreme process parameters are reached simultaneously. The effectiveness of this algorithm has been verified via extensive simulations.

TABLE I

| Algorithm 1 MIMO envelope algorithm |
| --- |
| 1: Input $\lambda_d$, $\lambda$ and the uncertainty intervals $[\underline{k}, \overline{k}]$, $[\underline{\tau}, \overline{\tau}]$ and $[\underline{T}, \overline{T}]$; |
| 2: Calculate all the output responses $Y_i = [y_1, \ldots, y_m]_i^T$ based on the ith extreme combinations of the uncertainty intervals (i = 1, 2, ..., 8) in $\mathcal{P}_E$. |
| 3: Obtain the upper envelope for all the outputs $\{\overline{y}_1, \ldots, \overline{y}_m\}$ by calculating $\max_{i\in\{1,2,\ldots,8\}} Y_i(k,:)$, k = 1, 2, ..., m. |
| 4: Obtain the lower envelope for all the outputs $\{\underline{y}_1, \ldots, \underline{y}_m\}$ by calculating $\min_{i\in\{1,2,\ldots,8\}} Y_i(k,:)$, k = 1, 2, ..., m. |

MIMO Tuning Algorithm

This section discusses the actual tuning algorithm for model-based controllers of uncertain MIMO processes. As explained below, the tuning algorithm represents an iterative tuning procedure that determines the values of $\lambda$ and $\lambda_d$ based on the visualization technique described in the prior section. In order to solve Equation (12), the relationship between the $\lambda$-parameters and the performance indices of each output, such as $OS_i(\lambda, \lambda_d)$ and $T_{s,i}(\lambda, \lambda_d)$ in Equation (12), is explored. As the analytical expressions of the performance indices may not exist, an empirical analysis can be carried out to aid the tuning procedure.

According to the 2DOF tuning structure, the closed-loop system's behavior is governed by the $F_r$ and $F_d$ filters 206-208. As both filters 206-208 have diagonal structures and $\lambda$ and $\lambda_d$ only exist on the diagonal entries, it is intuitive to assume that the closed-loop response of the $i^{th}$ output is dominated by the $i^{th}$ elements in $\lambda$ and $\lambda_d$ (which are denoted $\lambda_i$ and $\lambda_{d,i}$). Also, given each output of the MIMO system, the corresponding $F_r$ and $F_d$ filters 206-208 can be designed based on the dominant or primary open-loop system producing that output. This also helps to ensure that the specific pair of $\lambda$-parameters plays a dominant role only for the closed-loop response of the single corresponding output. In this way, $OS_i(\lambda, \lambda_d)$ and $T_{s,i}(\lambda, \lambda_d)$ are functions of only $\lambda_i$ and $\lambda_{d,i}$. In other words, $OS_i(\lambda, \lambda_d)=OS_i(\lambda_i, \lambda_{d,i})$ and $T_{s,i}(\lambda, \lambda_d)=T_{s,i}(\lambda_i, \lambda_{d,i})$.

Figure 3A:
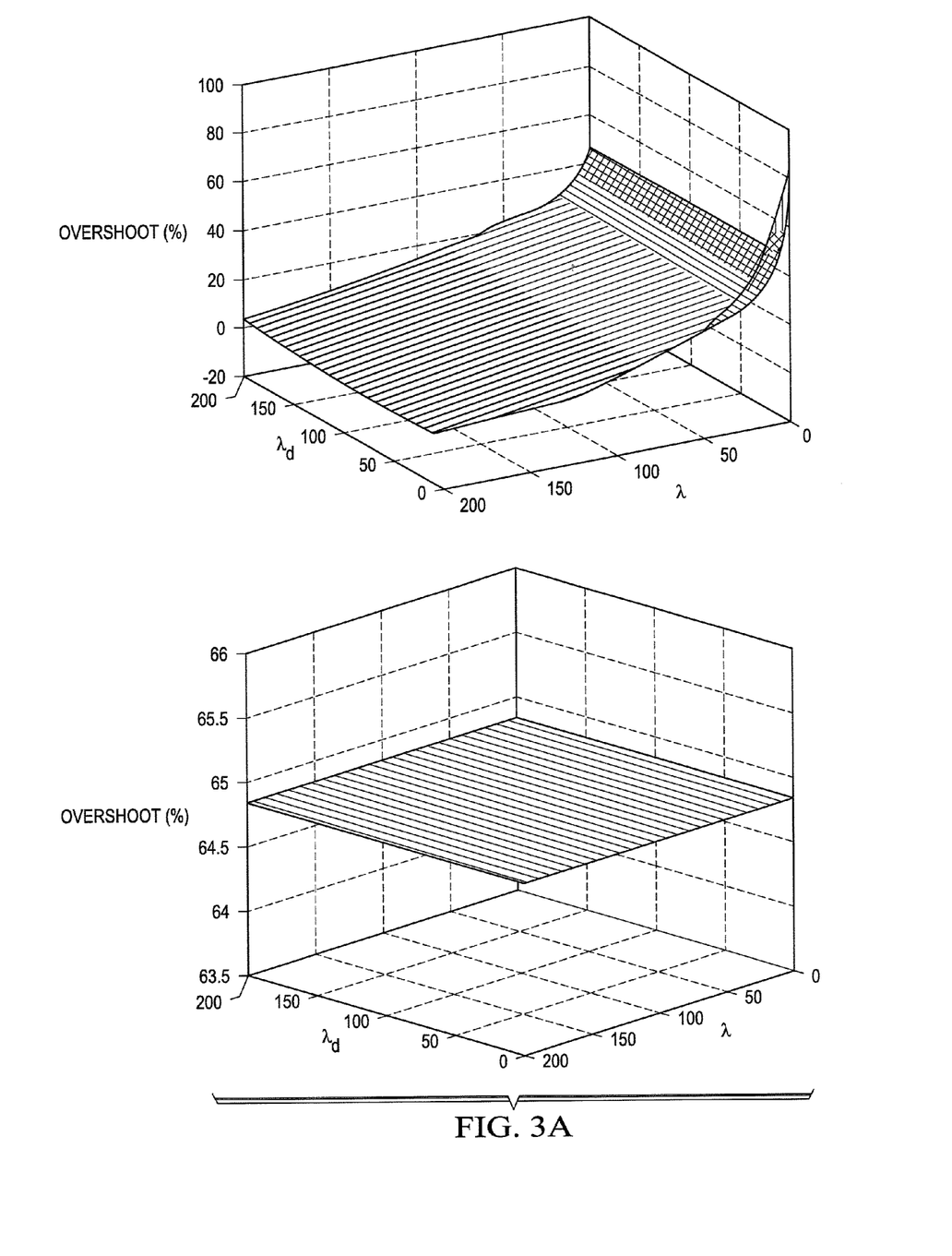
Figure 3B:
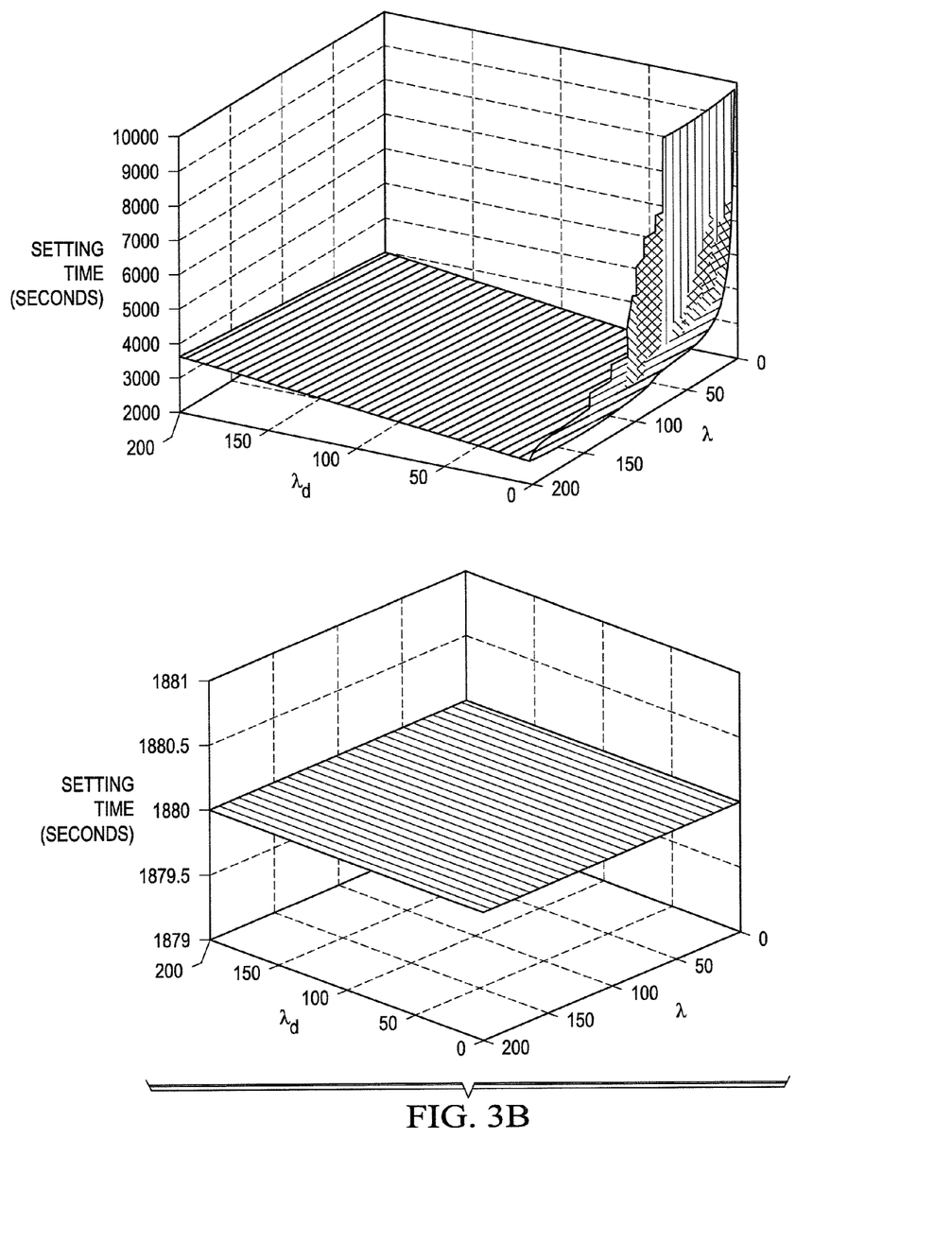

Examples of these properties are illustrated in FIGS. 3A and 3B via a typical 2-by-3 MD process. In particular, FIG. 3A illustrates a numerical verification of $OS_i(\lambda, \lambda_d)$, and FIG. 3B illustrates a numerical verification of $T_{s,i}(\lambda, \lambda_d)$. These illustrations have been verified through extensive simulations with other types of MIMO systems. Based on FIGS. 3A and 3B, two observations can be made. First, from the right graphs in FIGS. 3A and 3B, it can be seen that the adjustment of $\lambda_1$ and $\lambda_{d,1}$ does not affect the overshoot and settling time of the second output significantly if at all, which verifies the idea above. Second, the overshoot could be empirically treated as a monotonic function of $\lambda$, and the settling time could be considered as a unimodal function of $\lambda_d$, which can basically be determined by the 2DOF MPC structure.

Thus, as the closed-loop response of the $i^{th}$ output is dominated by $\lambda_i$ and $\lambda_{d,i}$, the tuning problem in Equation (12) can be simplified from a MIMO tuning problem to m individual MISO tuning problems in which $\lambda_i$ and $\lambda_{d,i}$ are tuned for the $i^{th}$ output separately. Mathematically, the new MISO tuning problem can be expressed as:

$$\min_{\lambda_i, \lambda_{d,i}} T_{s,i}(\lambda_i, \lambda_{d,i}), \quad (15)$$

$$\text{s.t.} \quad OS_i(\lambda_i, \lambda_{d,i}) \leq OS_i^* \quad 1 \leq i \leq m,$$

$$TV_i(\lambda_i, \lambda_{d,i}) \leq TV_i^* \quad 1 \leq i \leq m,$$

$$t_\lambda \leq 30 \text{ s},$$

based on which the tuning algorithm described below is proposed.

It is worth noting that end users are often not familiar with "total variation." Various approaches could therefore be used to handle this issue, such as by specifying the total variation $TV_i^*$ based on the overshoot according to $TV_i^*=1+2 OS_i^*$ or based on the decay ratio (DR*) according to $TV_i^*=1+[3OS_i^*/(1-DR_i^*)]$. The overshoot-based $TV_i^*$ is slightly conservative, while the decay ratio-based $TV_i^*$ relies on additional knowledge of the decay ratio for the end users. Thus, users can choose either option in different situations depending on their preferences and process knowledge.

Based on the empirical properties of $OS_i(\lambda, \lambda_d)$ and $T_{s,i}(\lambda, \lambda_d)$, an efficient MIMO tuning algorithm is now described. As $T_{s,i}(\lambda, \lambda_d)$ is tuned using only $\lambda_i$ and $\lambda_{d,i}$ in the MISO tuning problem of Equation (15), it is similar to the SISO tuning problem described in U.S. patent application Ser. No. 14/314,221. One feasible method to the tuning problem is to solve each of the MISO tuning problems one-by-one via the proposed counter-line searching tuning algorithm in U.S. patent application Ser. No. 14/314,221. However, this method may be too time-consuming in certain situations where there are constraints on tuning time. Based on Algorithm 1 above, instead of solving the MISO tuning problems one after the other, a MIMO tuning algorithm can solve all MISO tuning problems simultaneously by searching for the optimal $\lambda$-parameters for all of the MISO systems along m identical counter-lines at the same time. Because of this, the proposed tuning algorithm is almost as fast as solving only one MISO tuning problem. The fast algorithm is feasible because the counter-line searching is based on the worst-case performance indices calculated by Algorithm 1 and, when Algorithm 1 is executed, the performance indices are computed for all of the MISO systems. Moreover, as all the MISO tuning problems are almost independent (tuning of $(\lambda_i, \lambda_{d,i})$ does not affect that of $(\lambda_j, \lambda_{d,j})$ where $j \neq i$), the proposed tuning algorithm below can produce the same results as those of tuning the MISO systems one after another.

To implement this approach, the MIMO tuning algorithm described below includes two sub-algorithms. The first sub-algorithm (Algorithm 2 in Table II) finds the corresponding $\lambda_i$, $i=1, \ldots, m$ on a contour line for a fixed value of $\lambda_{d,i}$, $i=1, \ldots, m$ (denoted $\lambda_i^c$) for all of the MISO systems. The second algorithm (Algorithm 3 in Table III) finds the optimal $\lambda_{d,i}$, $i=1, \ldots, m$ that leads to the smallest values of settling times for all of the outputs based on Algorithm 2.

TABLE II

Algorithm 2 Find $\lambda^c(TV^*, \lambda_d)$ and $T_s^c(TV^*, \lambda_d)$.

1: Input TV*, $\lambda_d$, and the uncertainty intervals [$\underline{k}$, $\overline{k}$], [$\underline{\tau}$, $\overline{\tau}$] and [$\underline{T}$, $\overline{T}$] and upper bound for $\lambda$: $\overline{\lambda}^*$;
2: Input $\in$;
3: NoFeasibleLambda = $1_{1 \times m}$;
4: $\underline{\lambda} \leftarrow 0.5_{1 \times m}$, $\overline{\lambda} \leftarrow \overline{\lambda}^*$;
5: while max $(\overline{\lambda} - \underline{\lambda}) > \in$ do
6:   for i=1 : m do
7:     $\lambda(i) \leftarrow (\overline{\lambda}(i) + \underline{\lambda}(i)) \times 0.5$
8:   end for
9:   Numerically evaluate the total variation and overshoot vectors $TV(\lambda, \lambda_d)$ and $OS(\lambda, \lambda_d)$
10:   for i=1 : m do
11:     if $TV(i) > TV_i^*$ then
12:       $\underline{\lambda}(i) \leftarrow \lambda(i)$;
13:     else
14:       if $OS(i) < OS_i^*$ then
15:         $\overline{\lambda}(i) \leftarrow \lambda(i)$;
16:         NoFeasibleLambda(i) = 0;
17:       else
18:         $\underline{\lambda}(i) \leftarrow \lambda(i)$;
19:       end if
20:     end if
21:   end for
22: end while
23: $\lambda^c(TV^*, \lambda_d) \leftarrow (\underline{\lambda} + \overline{\lambda})/2$ ;
24: $T_s^c(TV^*, \lambda_d) \leftarrow T_s(\lambda^c, \lambda_d)$;
25: end

TABLE III

Algorithm 3 Tuning of $\lambda$ and $\lambda_d$.

1: Input uncertainty intervals [$\underline{k}$, $\overline{k}$], [$\underline{\tau}$, $\overline{\tau}$] and [$\underline{T}$, $\overline{T}$] and upper bound for $\lambda_d$: $\overline{\lambda}_d^*$;
2: Input the overshoot specification OS*;
3: Calculate the total variation specification according to $$TV^* = 1 + 2OS^* \text{ or } TV^* = 1 + \frac{3OS^*}{1 - DR^*};$$

4: Input $\epsilon$;
5: $\underline{\lambda}_d \leftarrow 0.5_{1 \times m}$, $\overline{\lambda}_d \leftarrow \overline{\lambda}_d^*$;
6: while max $(\overline{\lambda}_d - \underline{\lambda}_d) > \epsilon$ do
7:   for i = 1 : m do
8:     $\lambda_{d1}(i) \leftarrow \underline{\lambda}_d(i) + (\overline{\lambda}_d(i) - \underline{\lambda}_d(i)) \times 0.382$;
9:     $\lambda_{d2}(i) \leftarrow \underline{\lambda}_d(i) + (\overline{\lambda}_d(i) - \underline{\lambda}_d(i)) \times 0.618$;
10:   end for
11:   Numerically evaluate the settling times $T_{s1}^c(TV^*, \lambda_{d1})$ and $T_{s2}^c(TV^*, \lambda_{d2})$;
12:   for i = 1 : m do TABLE III-continued Algorithm 3 Tuning of $\lambda$ and $\lambda_d$.

```
13:        if NoFeasibleLambda(i) = 0 then
14:            if T^c_{s1}(i) > T^c_{s2}(i) then
15:                \underline{\lambda_d}(i) ← λ_{d1}(i);
16:            else
17:                \overline{\lambda_d}(i) ← λ_{d2}(i);
18:            end if
19:        else
20:            \underline{\lambda_d}(i) ← λ_{d1}(i);
21:        end if
22:    end for
23: end while
24: λ_d ← (\overline{\lambda_d} + \underline{\lambda_d}) / 2;
25: λ ← λ^c(TV*, λ_d);
26: end
```

In Algorithm 2, since $TV_i(\lambda_i, \lambda_{d,i})$ is a monotonic function of $\lambda_i$ for a fixed $\lambda_{d,i}$, the search of $\lambda_i^c$ that leads to any given value of $TV_i^*$ for a fixed $\lambda_{d,i}$ can be achieved by a bisection search. $T_s^c(TV^*, \lambda_d)$ is used to represent the dependence of the worst-case settling time on $TV^*$ and $\lambda_d$ to avoid notational confusion. Note that all of the $\lambda_i$ values can be tuned before evaluating the TV and OS for all of the outputs, based on which the search on all of the contour-lines are executed simultaneously rather than one after another. Also, note that lines 14-19 of Algorithm 2 are used if $TV^*$ is chosen based on the decay ratio technique.

In Algorithm 3, for each MISO system, the worst-case settling time can be approximately a unimodal function of $\lambda_{d,i}$. The underlying assumption is that $\lambda_{d,i}$ controls the robust stability, so a smaller $\lambda_{d,i}$ leads to an aggressive and oscillatory response while a larger $\lambda_{d,i}$ leads to a sluggish response. Thus, a golden search could be utilized in Algorithm 3 to find the optimal $\lambda_{d,i}$, i=1, ..., m that offers the smallest worst-case settling times for all of the MISO systems. The corresponding value of $\lambda_i$, i=1, ..., m can be obtained through Algorithm 2.

The fast tuning algorithm described above not only solves the MIMO tuning problem efficiently, it also provides the ability to accurately predict the tuning time. The ability to accurately predict the tuning time is highly demanded or desired with algorithms designed for commercial tuner software because the user-friendliness can be improved. In this case, since the proposed tuning algorithm is a line search-based method, the computation time can be estimated based on the number of iterations needed for convergence and the time required for each iteration. The number of iterations may only depend on the predefined search region and stop criteria, and the iteration time can be decided by the time required for numerically evaluating the performance indices (the duration of which can be computed based on the time required to call Algorithm 1, which can also be pre-calculated). Thus, the tuning time can be predicted with Algorithm 4 in Table IV.

TABLE IV

Algorithm 4 Predict $t_\lambda(\overline{\lambda}^*, \overline{\lambda}^*_d)$.

```
1: Input \overline{λ}^*_d, \overline{λ}^* and the uncertainty intervals [\underline{k}, \overline{k}], [\underline{τ}, \overline{τ}]
   and [\underline{T}, \overline{T}];
2: Input ε;
3: Input N_{TV} and N_{T_s};
4: Run the MIMO simulator 3 times to obtain the computation
   time t_{β,1}, t_{β,2} and t_{β,3};
5: t_β = (t_{β,1} + t_{β,2} + t_{β,3}) / 3;
```

TABLE IV-continued

Algorithm 4 Predict $t_\lambda(\overline{\lambda}^*, \overline{\lambda}^*_d)$.

```
6:  x = log(ε/max(\overline{λ}^* - 0.5_{1×m})) / log(0.5);
7:  I_λ = ceil(x);
8:  y = log(ε/(\overline{λ}^*_d - 0.5_{1×m})) / log(0.618);
9:  I_{λ_d} = ceil(y);
10: t_λ = ((I_λ × N_{TV} + N_{T_s}) × 2 + I_{λ_d} × (I_λ × N_{TV} + N_{T_s})) × \bar{t}_β;
11: end
```

In Algorithm 4, $N_{TV}$ and $N_{T_s}$ (line 3) are the numbers of extreme-case systems considered to calculate the total variation and the settling time. According to Algorithm 1, both values can be eight by default, but the number of extreme-case systems considered in Algorithm 1 can be optimized to further save computation time. Also, $t_β$ (line 5) is the time cost for a single run of the simulation (based on which the running time of Algorithm 1 can be obtained). As a computer may need more time to run a program for the first time, the average of multiple runs (such as three) can be used as the simulation time. In addition, $I_λ$ (line 7) and $I_{λ_d}$ (line 9) are the iteration numbers for Algorithm 2 and 3, respectively. The formula in line 10 is constructed based on the structure of the tuning algorithm.

Industrial Example

In this section, the proposed tuning algorithm is illustrated with reference to an example extracted from a real application involving MD paper machine control. The example illustrates the efficiency of the proposed algorithms. In particular, this example involves a 2-by-3 process of a paper machine, where a controller uses a model to control the Conditioned Weight (CW) and Moisture (M) of paper products. Inputs to the process are Base Stock Flow (SF) to the headbox, Main Steam (MS) in the drying cylinders, and Machine Speed (S). The nominal model is shown in Table V below.

TABLE V

| O\I | SF | MS | S |
|---|---|---|---|
| CW | $\frac{0.35}{80s+1}e^{-80s}$ | — | $\frac{-0.025}{30s+1}e^{-51s}$ |
| M | $\frac{0.4}{90s+1}e^{-80s}$ | $\frac{-0.08}{150s+1}e^{-80s}$ | — |

Figure 4A:
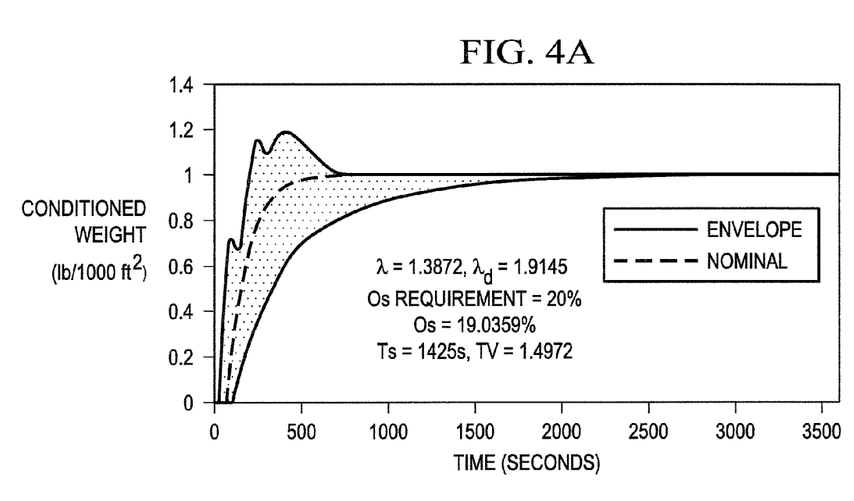
Figure 4B:
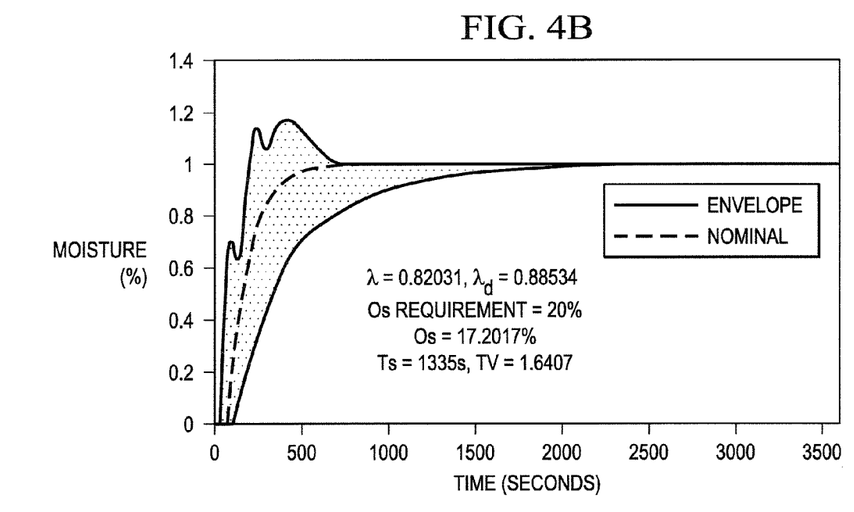
Figure 5A:
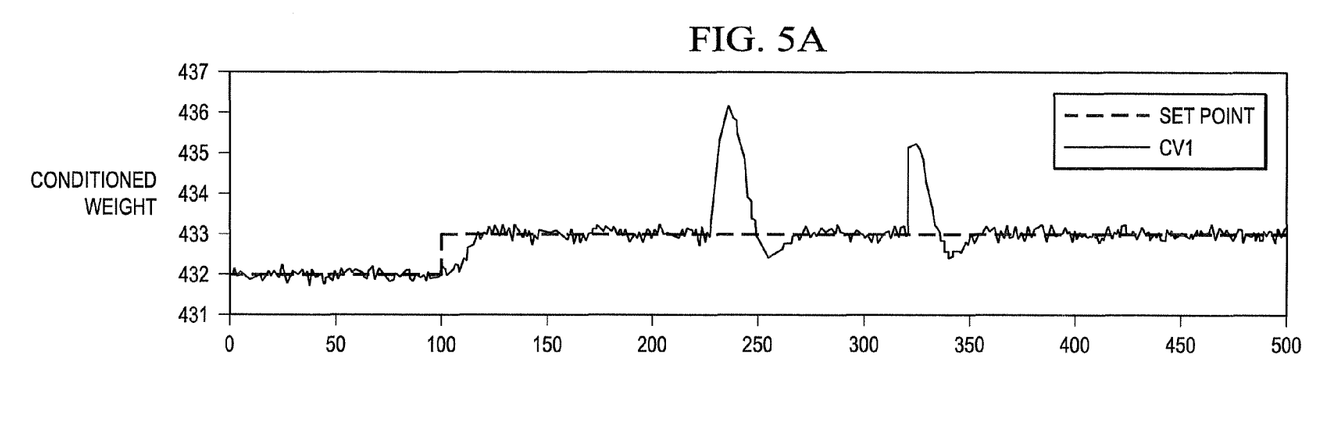
Figure 5B:
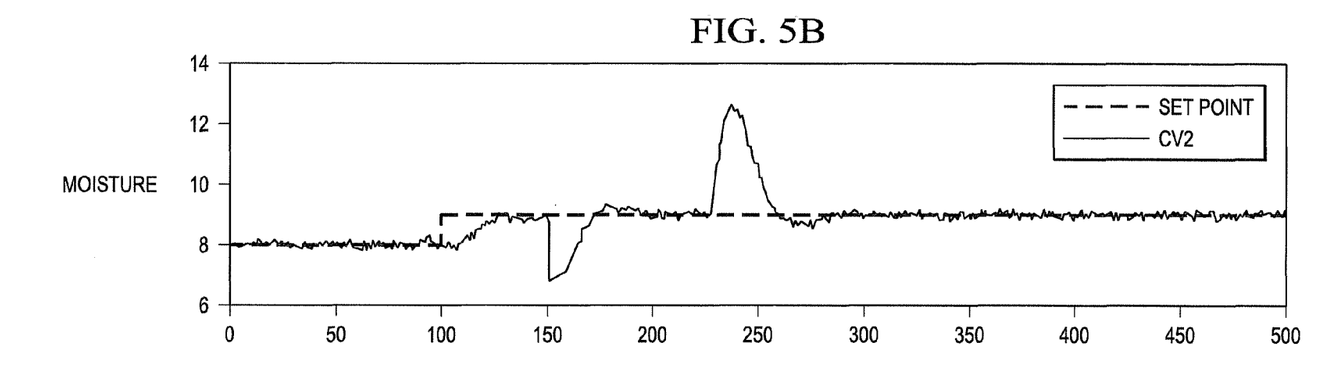

This model was identified using an advanced industrial control software package. The MPC weighting matrices are set to $Q_1=I$, $Q_2=0.01×I$, and $Q_3=0$. The prediction horizon $H_p$ is 68, and the control horizon $H_u$ is 27. For the nominal model in Table V, the proposed tuning algorithm is applied at an uncertainty level [−50%, 30%] with OS*=20%. The tuning procedure took 9.56 seconds on a desktop computer with an i5 processing core and 6 GB of memory, and the predicted tuning time from Algorithm 4 was 10.00 seconds. The obtained closed-loop step response envelopes as well as the tuning results are shown in FIGS. 4A and 4B for all outputs.

To test the design results in a real-time MPC plus simulator environment, to account for model mismatch, the actual process is taken as shown in Table VI, which lies within the uncertainty level [−50%, 30%] of the nominal system in Table V.

TABLE VI

| O\I | SF | MS | S |
|---|---|---|---|
| CW | $\frac{0.455}{104s+1}e^{-104s}$ | — | $\frac{-0.0325}{30s+1}e^{-66.3s}$ |
| M | $\frac{0.52}{117s+1}e^{-104s}$ | $\frac{-0.1040}{195s+1}e^{-104s}$ | — |

The initial operating points are y(0)=[432; 8] and u(0)= [3790; 79; 447]. The MPC optimization parameters $H_p$, $H_u$, $Q_1$, $Q_2$, and $Q_3$ are chosen to be the same as those used for the above tuning results, and the following constraints on control signals are incorporated in the MPC implementation:

$$0.9u(0) \leq U \leq 1.1u(0),$$

$$-0.1u(0) \leq \Delta U \leq 0.1u(0) \quad (16)$$

To take into account possible changes of operating conditions, a setpoint change of 1 lb/1000 ft² is made at t=100 s for all outputs, an output disturbance of 2 lbs/1000 ft² is introduced for output 1 at t=320 s, an output disturbance of −2 lbs/1000 ft² is in effect at t=150 s for output 2, an input disturbance of 10 gpm is made at t=220 s for input 1, and measurement noise is taken to be zero-mean Gaussian with a standard deviation 0.1 lbs/1000 ft². From FIGS. 5A and 5B, it is shown that despite the large model mismatch and measurement noise, all system outputs robustly track the setpoint for changes in working conditions, which further indicates the efficiency of the proposed tuning algorithm.

CONCLUSION

In this patent document, systematic procedures have been described for automatic parameter tuning of model-based controllers used in MIMO processes under user-specified parametric uncertainties. An envelope algorithm for time-domain closed-loop performance visualization considering the parametric uncertainties for a MIMO process was provided. Also, a fast MIMO tuning algorithm that automatically determines controller tuning parameters $\lambda$ and $\lambda_d$ that fulfill the specifications on the worst-case time-domain performance indices under the parametric uncertainty specifications for the MIMO process was provided. In addition, a technique to predict the tuning time was provided to further improve the user-friendliness of the overall tuning algorithm.

Note that while the techniques and algorithms were often described above with reference to tuning an MD-MPC controller associated with a web manufacturing or processing system, the same or similar techniques could be used to tune any other suitable model-based controller. The model-based controller may or may not be used in a web manufacturing or processing system since MPC and other model-based controllers can be used in a wide variety of industries. The same or similar techniques could be used to tune any suitable model-based controller in any suitable industry.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit" and "receive," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for controlling a web processing system by a model-based industrial process controller that controls associated processes of a web process facility in the web processing system comprising:

obtaining information based on at least one sensor located in the web process facility communicating to the model-based industrial process controller through a network;

identifying (i) uncertainties associated with multiple time-domain parameters of a model and (ii) time-domain performance specifications for the model-based industrial process controller, the model mathematically representing a multiple-input, multiple-output (MIMO) industrial process; and generating multiple tuning parameters for the controller based on the uncertainties and the time-domain performance specifications, the tuning parameters including vectors of tuning parameters associated with the controller, each vector including values associated with different outputs of the industrial process, wherein generating the multiple tuning parameters comprises:

constructing multiple multiple-input, single-output (MISO) tuning problems based on a MIMO tuning problem, each MISO tuning problem associated with a different output of the MIMO industrial process, and solving each MISO tuning problem to identify one of the values in each vector, wherein solving each MISO tuning problem comprises:

identifying the values in a first of the vectors assuming fixed values in a second of the vectors; and identifying, the values in the second vector that minimize settling times for the outputs of the MIMO industrial process;

controlling, by the controller, the associated processes of the web process facility in the web processing system network utilizing the multiple tuning parameters.

2. The method of claim 1, further comprising:
generating a graphical display identifying (i) multiple expected step responses of the MIMO industrial process based on the tuning parameters of the controller and (ii) an envelope around the one or more expected step responses based on the uncertainties associated with the time-domain parameters of the model;

wherein the envelope is generated using different combinations of extreme values of the time-domain parameters, the extreme values based on the uncertainties of the time-domain parameters.

3. The method of claim 2, wherein:
the time-domain parameters comprise a process gain, a time constant, and a time delay for each input-output pair of the model;
the time-domain performance specifications comprise requirements related to worst-case overshoots, settling times, and total variations; and
the uncertainties are specified as intervals in which the time-domain parameters lie.

4. The method of claim 1, wherein:
the first vector comprises a vector of reference tracking performance ratios, each reference tracking performance ratio defining a ratio between a desired closed-loop reference tracking response time of the controller and an open-loop response time for one output of the MIMO industrial process; and
the second vector comprises a vector of disturbance rejection performance ratios, each disturbance rejection performance ratio defining a ratio between a desired closed-loop disturbance rejecting response time of the controller and the open-loop response time of the one output of the MIMO industrial process.

5. The method of claim 1, further comprising:
predicting a tuning time of the controller prior to generating the tuning parameters for the controller.

6. The method of claim 1, wherein obtaining the information identifying the uncertainties and the performance specifications comprises receiving the information from a user.

7. An apparatus for controlling a web processing system by a model-based industrial process controller that controls associated processes of a web process facility in the web processing system comprising:

at least one memory configured to store information, obtained based on at least one sensor located in the web process facility communicating to the model-based industrial process controller through a network, identifying (i) uncertainties associated with multiple time-domain parameters of a model and (ii) time-domain performance specifications for the model-based industrial process controller, the model mathematically representing a multiple-input, multiple-output (MIMO) industrial process; and at least one processing device configured to generate multiple tuning parameters for the controller based on the uncertainties and the time-domain performance specifications, the tuning parameters including vectors of tuning parameters associated with the controller, each vector including values associated with different outputs of the industrial process, wherein the multiple tuning parameters are utilized by the controller to control the associated processes of the web process facility in the web processing system, wherein the at least one processing device is configured to:

construct multiple multiple-input, single-output IMISO) tuning problems based on a MIMO tuning problem, each MISO tuning problem associated with a different output of the MIMO industrial process; and solve each MISO tuning problem to identify one of the values in each vector, wherein the at least one processing device is configured to:

identify the values in a first of the vectors assuming fixed values in a second of the vectors; and identify the values in the second vector that minimize settling times for the outputs of the MIMO industrial process.

8. The apparatus of claim 7, wherein the at least one processing device is further configured to:
generate a graphical display identifying (i) multiple expected step responses of the MIMO industrial process based on the tuning parameters of the controller and (ii) an envelope around the one or more expected step responses based on the uncertainties associated with the time-domain parameters of the model;
generate the envelope using different combinations of extreme values of the time-domain parameters, the extreme values based on the uncertainties of the time-domain parameters.

9. The apparatus of claim 8, wherein:
the time-domain parameters comprise a process gain, a time constant, and a time delay for each input-output pair of the model;
the time-domain performance specifications comprise requirements related to worst-case overshoots, settling times, and total variations; and
the uncertainties are specified as intervals in which the time-domain parameters lie.

10. The apparatus of claim 7, wherein:
the first vector comprises a vector of reference tracking performance ratios, each reference tracking performance ratio defining a ratio between a desired closed-loop reference tracking response time of the controller and an open-loop response time for one output of the MIMO industrial process; and
the second vector comprises a vector of disturbance rejection performance ratios, each disturbance rejection performance ratio defining a ratio between a desired closed-loop disturbance rejecting response time of the controller and the open-loop response time of the one output of the MIMO industrial process.

11. The apparatus of claim 7, wherein the at least one processing device is further configured to:
predict a tuning time of the controller prior to generation of the tuning parameters for the controller.

12. A non-transitory computer readable medium containing instructions that when executed cause at least one processing device to control a web processing system by a model-based industrial process controller that controls associated processes of a web process facility in the web processing system:
  obtain information based on at least one sensor located in the web process facility communicating to the model-based industrial process controller through a network;
  identify (i) uncertainties associated with multiple time-domain parameters of a model and (ii) time-domain performance specifications for a model-based industrial process controller, the model mathematically representing a multiple-input, multiple-output (MIMO) industrial process; and
  generate multiple tuning parameters for the controller based on the uncertainties and the time-domain performance specifications, the tuning parameters including vectors of tuning parameters associated with the controller, each vector including values associated with different outputs of the industrial process, wherein the multiple tuning parameters are utilized by the controller to control the associated processes of the web process facility in the web processing system, wherein the instructions that when executed cause the at least one processing device to generate the multiple tuning parameters comprise instructions that when executed cause the at least one processing device to:
  construct multiple multiple-input, single-output (MISO) tuning problems based on a MIMO tuning problem, each MISO tuning problem associated with a different output of the MIMO industrial process; and
  solve each MISO tuning problem to identify one of the values in each vector, wherein the instructions that when executed cause the at least one processing device to solve each MISO tuning problem comprise instructions that when executed cause the at least one processing device to:
  identify the values in a first of the vectors assuming fixed values in a second of the vectors, the first vector comprising a vector of reference tracking performance ratios, each reference tracking performance ratio defining a ratio between a desired closed-loop reference tracking response time of the controller and an open-loop response time for one output of the MIMO industrial process; and
  identify the values in the second vector that minimize settling times for the outputs of the MIMO industrial process, the second vector comprising a vector of disturbance rejection performance ratios, each disturbance rejection performance ratio defining a ratio between a desired closed-loop disturbance rejecting response time of the controller and the open-loop response time of the one output of the MIMO industrial process.

13. The non-transitory computer readable medium of claim 12, wherein the instructions when executed further cause the at least one processing device to:
  generate a graphical display identifying (i) multiple expected step responses of the MIMO industrial process based on the tuning parameters of the controller and (ii) an envelope around the one or more expected step responses based on the uncertainties associated with the time-domain parameters of the model;
  generate the envelope using different combinations of extreme values of the time-domain parameters, the extreme values based on the uncertainties of the time-domain parameters.

14. The non-transitory computer readable medium of claim 13, wherein:
  the time-domain parameters comprise a process gain, a time constant, and a time delay for each input-output pair of the model;
  the time-domain performance specifications comprise requirements related to worst-case overshoots, settling times, and total variations; and
  the uncertainties are specified as intervals in which the time-domain parameters lie.

15. The non-transitory computer readable medium of claim 12, wherein the instructions when executed further cause the at least one processing device to:
  predict a tuning time of the controller prior to generation of the tuning parameters for the controller.

* * * * *